July 7, 1953
E. V. HARDWAY, JR
2,644,900
ELECTROKINETIC DEVICE
Filed Nov. 27, 1951
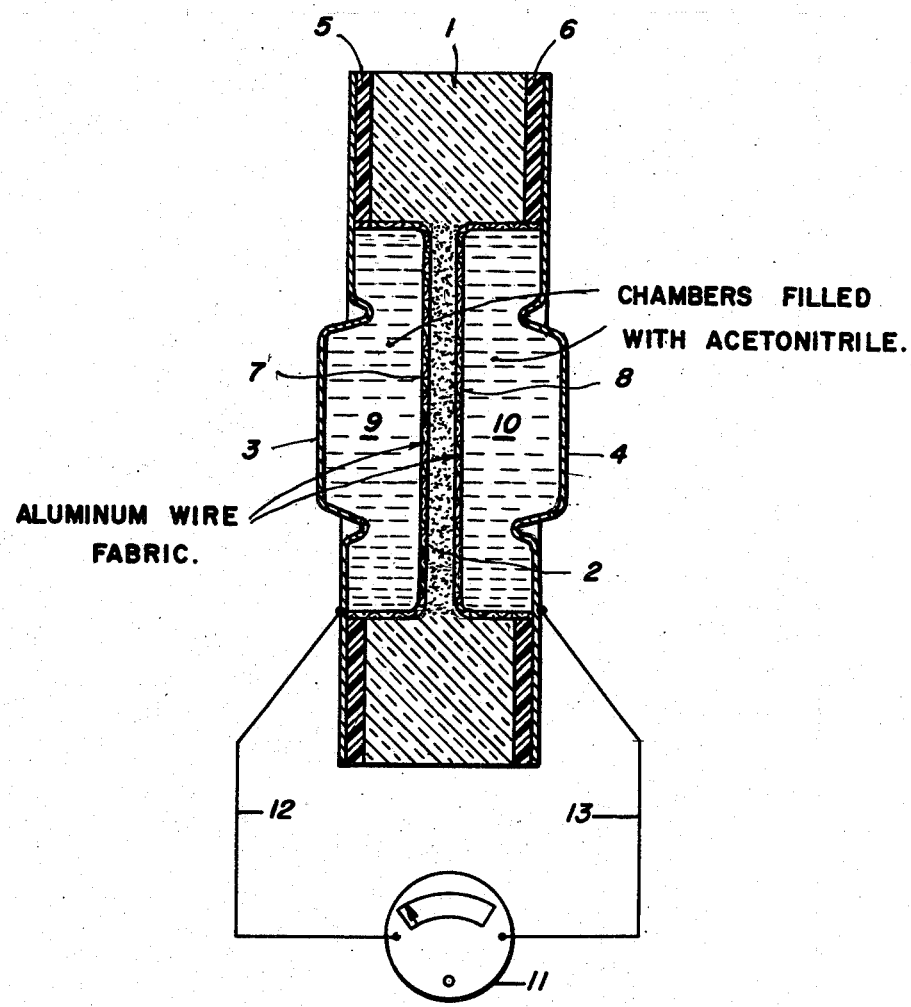
INVENTOR
EDWARD V. HARDWAY, JR.
BY *Stone, Boyden & Mack*
ATTORNEYS Patented July 7, 1953

2,644,900

UNITED STATES PATENT OFFICE 2,644,900

ELECTROKINETIC DEVICE

Edward V. Hardway, Jr., Richmond, Va.

Application November 27, 1951, Serial No. 258,490

4 Claims. (Cl. 310—2)

This invention relates to electrokinetic measuring apparatus and electrokinetic transducer cells therefor, and more particularly to such devices capable of prolonged commercial use without loss of calibration.

As described in my copending application, Serial Number 258,493, entitled Electrokinetic Measuring Instruments and filed even date herewith, electrokinetic transducers have long been known but until the present time have been impractical for commercial use, primarily because their characteristics change with time. Such devices comprise a sealed enclosure, a porous plug dividing the interior of the enclosure into two chambers, the chambers being filled with an electrokinetic liquid, and an electrode in each chamber. One chamber may be closed by a flexible diaphragm exposed to the physical variable to be measured, and the other chamber closed by a similar diaphragm or equivalent means for applying a restoring force to the liquid. In operation, movement is imparted to the liquid by the physical variable, forcing the liquid to flow through the plug and resulting in the production of a streaming potential, appearing across the electrodes. The molecules of the electrokinetic liquid are electro-statically unbalanced. As a result, at the interface between the liquid and the surface of a pore of the plug the molecules assume preferred orientations, and the liquid in the center region of the pore assumes a charge opposite to that of the liquid at the interface. When the liquid moves through the pore under an applied pressure, a volume current of charged liquid flows through the plug and a potential difference is established across the plug. A countercurrent is present, because of the liquid's conductivity, which limits the potential to a definite value proportioned to the applied pressure.

Prior-art transducers of this type have been operable, particularly as employed in laboratory and experimental apparatus for biochemical research. The primary difficulty standing in the way of commercial use of such transducers has been that, while the electrokinetic transducers of the prior art operate when assembled, and an electroresponsive meter or the like can be connected across the electrodes and the entire instrument calibrated, the calibration is lost within a relatively short time as a result of progressive variations in the characteristics of the electrokinetic cell, and the device thus becomes useless as a measuring instrument. I have discovered that one major cause of such loss of calibration is the change in characteristics of the electrokinetic liquid as a result of contamination by contact with the structural parts of the cell.

While from this discovery, it would seem reasonably simple to select liquids which would provide the desired characteristics in an electrokinetic cell, I have found this not to be the case.

It appears that, because the conductivity of electrokinetic liquids is very low, due to the low degree of ionization, the contamination effects are severe. Unfortunately, many of the liquids with the most desirable properties are excellent solvents, so the tendency toward contamination is great. Also, many electrokinetic liquids have other undesirable properties such as high toxicity, low boiling points or high freezing points. Many of the liquids would require that cell parts be of expensive materials such as platinum, gold or silver. Other electrokinetic liquids, and particularly those which are good solvents, prohibit the use of common sealing materials, such as the microcrystalline hydrocarbon waxes, to seal the cell.

I have found but one liquid which has superior electrokinetic properties and which, in combination in a cell as hereinafter described, gives the relatively constant electrokinetic action over prolonged time periods necessary for practical operation. This liquid is acetonitrile.

The electrokinetic properties of acetonitrile are exceptional. A good comparative index of performance largely independent of conductivity of the liquid (assuming comparative tests are all made with the same porous plug) is given by the expression:

$$\frac{H}{PRd}$$

where H is the potential difference across the plug, P is the applied pressure across the plug and $Rd$ is the cell resistance.

Employing a test cell comprising a Pyrex glass sealing tube divided into two chambers by a microporous fritted glass disc 30 mm. in diameter, measurements were made for diethyl ketone, acetone, methanol, and acetonitrile. The values of the comparative index just defined, expressed in volts per pound per square inch per megohm for the four liquids are as follows:

Diethyl ketone _____ 2.9
Acetone _____ 3.5
Methanol _____ 4.3
Acetonitrile _____ 8.0

Thus it is seen that the electrokinetic properties of acetonitrile are nearly twice as good as those of methanol. Acetonitrile is superior both from the above considerations and from the consideration of most efficient energy conversion, i. e., in supplying maximum power to a matched load impedance connected across the electrodes of an electrokinetic cell.

While the sensitivity of a cell employing acetonitrile varies with temperature, as is the case with substantially all electrokinetic liquids, I have found that the extent of this variation for acetonitrile is acceptable and that the cell can be compensated by employing a temperature responsive resistance in the manner described in my copending application, Serial Number 258,493.

Acetonitrile has a boiling point of 81.6° C. and a freezing point of —44.9° C., thus presenting a wide temperature range of operability. Its toxicity is low, being close to that of acetic acid.

Referring now to the drawing, a typical cell embodying the invention will be described. The cell enclosure comprises an outer insulating ring 1 of glass. A porous disc 2 is sealed into the ring 1 so as to divide the interior of the ring into two chambers 9 and 10. Preferably, the disc 2 is of fritted glass and is fused at its periphery directly to the interior of the ring 1. Flexible metal diaphragms 3 and 4 are disposed at each end of the ring 1 and are sealed thereto by means of gaskets 5 and 6. Permeable electrodes 7 and 8, preferably of fine mesh wire cloth, are disposed one in each of the chambers 9 and 10. These electrodes are cup-shaped and extend across gaskets 5 and 6, respectively, to make electrical contact with the metal diaphragms 3 and 4, so that the diaphragms may serve as the cell contacts.

The chambers 9 and 10 are filled with acetonitrile. It will be noted that, when the cell is in assembled condition as seen in Fig. 1, the acetonitrile is in direct contact with the diaphragms 3 and 4, the gaskets 5 and 6, and the electrodes 7 and 8. Accordingly, all of these components must be of materials inert to acetonitrile. As has already been stated, when many liquids other than acetonitrile are used it is necessary to make the metal components of the cell, or at least the liquid-contacting surfaces thereof, of one of the expensive noble metals. Such metals are not suitable for use in a cell employing acetonitrile as the electrokinetic liquid. I have discovered that aluminum is suitable, and I prefer to employ aluminum for the diaphragms 3 and 4, and the electrodes 7 and 8. Thus, the diaphragms may be of sheet aluminum, and the electrodes of fine mesh aluminum wire fabric. Alternatively, only the surfaces of those parts contacting the acetonitrile may be of aluminum.

I prefer to make the sealing gaskets 5 and 6 of ethylene polymer, and particularly of polytetrafluoroethylene. To effect a tight seal, I prefer to dip the gaskets in a pure grade of melted microcrystalline hydrocarbon wax before assembly.

I have found that acetonitrile when standing in contact with aluminum, polytetrafluoroethylene and microcrystalline hydrocarbon wax for long periods of time is not contaminated by these materials. Accordingly, when an electrokinetic cell is constructed as herein disclosed, the cell exhibits substantially no change in sensitivity resulting from contamination of the electrokinetic liquid.

The inclusion of acetonitrile as the electrokinetic liquid is particularly advantageous in that it allows metal parts to be of aluminum, a metal which is inexpensive and has excellent physical characteristics. It should be noted that, where it is desirable to employ an aluminum alloy, such alloy should not include copper or other materials forming soluble ions. A suitable common hardening agent for aluminum is manganese.

While the use of aluminum for the metal parts of the cell is preferred when the electrokinetic liquid is acetonitrile, tin may be used as an alternative. Tin is substantially inert to acetonitrile but has somewhat less desirable physical properties than aluminum.

All metal parts of the cell in contact with the acetonitrile should be of the same metal to prevent electrochemical action. Thus, if the electrodes 7 and 8 are of aluminum, and it is desirable to make the bodies of the diaphragms 3 and 4 of a metal other than aluminum, the surfaces of the diaphragms in contact with the acetonitrile should consist of an aluminum overlay.

The plug or disc 2 may be any suitable porous body which is insoluble in acetonitrile. Suitable commonly available materials are glass and porcelain.

In use, the cell is mounted in a suitable instrument housing, such as described in my copending application, Serial Number 258,493, and a suitable electroresponsive meter or recorder 11, calibrated in terms of the physical variable to be measured, is connected across the electrodes 7 and 8, as by conductors 12 and 13 connected to diaphragms 3 and 4, respectively, to complete the instrument. To make the cell sensitivity independent of ambient temperature within acceptable tolerances, a negative temperature coefficient resistor circuit is connected across the electrodes 7 and 8, as disclosed in said application, Serial Number 258,493.

It will be obvious that solutions consisting predominantly of acetonitrile, but also containing inert compounds or other compounds inert to the materials of which the cell is constructed, may be used with somewhat reduced efficiency. For example, such materials as ethyl cyanide, methyl isocyanide or very pure water could be used with the acetonitrile. Such solutions would derive their most desirable electrokinetic properties from acetonitrile and their use therefore would not depart from the spirit of my invention.

I claim:

1. An electrokinetic cell comprising an enclosure, a porous plug disposed within said enclosure to divide the enclosure into two chambers, said chambers being filled with an electrokinetic liquid consisting predominantly of acetonitrile, and electrodes arranged one in contact with the liquid in each chamber, the portions of said electrodes in contact with said liquid being of a metal inert to acetonitrile.

2. An electrokinetic cell constructed in accordance with claim 1 and in which the portions of said electrodes in contact with said liquid are of aluminum.

3. An electrokinetic cell comprising an enclosing member, a porous plug disposed within said member to divide the interior thereof into two chambers, and flexible metal diaphragms disposed one across each end of said enclosing member to close said chambers, said chambers being filled with acetonitrile, and the portions of said diaphragms in contact with said acetonitrile being of aluminum.

4. An electrokinetic instrument capable of use for extended periods without substantial loss of calibration comprising the combination of a sealed enclosure, a porous insulating plug disposed within said enclosure to divide the interior thereof into two chambers, said chambers being filled with an electrokinetic liquid consisting predominantly of acetonitrile, a pair of electrodes arranged one in contact with the liquid in each chamber, said electrodes being of a metal inert to acetonitrile, and electro-responsive means connected across said electrodes to respond to the potential difference across said plug.

EDWARD V. HARDWAY, Jr.

No references cited.